(12) United States Patent
Liu (10) Patent No.: US 12,395,462 B1
(45) Date of Patent: *Aug. 19, 2025

(54) NAT TRAVERSAL IN VoIP COMMUNICATION SYSTEM

(71) Applicant: 8x8, Inc., Campbell, CA (US)

(72) Inventor: Zhishen Liu, Campbell, CA (US)

(73) Assignee: 8x8, Inc, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,302

(22) Filed: Nov. 14, 2023

Related U.S. Application Data

(63) Continuation of application No. 17/521,065, filed on Nov. 8, 2021, now Pat. No. 11,838,259, which is a continuation of application No. 16/859,785, filed on Apr. 27, 2020, now Pat. No. 11,184,320, which is a continuation of application No. 15/882,851, filed on Jan. 29, 2018, now Pat. No. 10,637,824, which is a continuation of application No. 14/093,211, filed on Nov. 29, 2013, now Pat. No. 9,912,636.

(51) Int. Cl.

| | |
|---|---|
| *H04L 12/851* | (2013.01) |
| *H04L 61/2503* | (2022.01) |
| *H04L 61/256* | (2022.01) |
| *H04L 61/2589* | (2022.01) |
| *H04L 65/1045* | (2022.05) |
| *H04L 65/1069* | (2022.01) |
| *H04L 65/1073* | (2022.01) |
| *H04L 61/2514* | (2022.01) |
| *H04M 7/00* | (2006.01) |

(52) U.S. Cl.
CPC ...... *H04L 61/2503* (2013.01); *H04L 61/2564* (2013.01); *H04L 61/2589* (2013.01); *H04L 65/1045* (2022.05); *H04L 65/1069* (2013.01); *H04L 65/1073* (2013.01); *H04L 61/2514* (2013.01); *H04M 7/006* (2013.01)

(58) Field of Classification Search
CPC ............... H04L 65/1006; H04L 29/125; H04L 29/12547; H04L 29/12924; H04L 65/1073
See application file for complete search history.

(56) References Cited

U.S. PATENT DOCUMENTS

| | | | | |
|---|---|---|---|---|
| 7,826,602 B1* | 11/2010 | Hunyady | ............ | H04L 61/2564 709/227 |
| 8,228,861 B1* | 7/2012 | Nix | ...................... | H04L 65/1069 370/329 |
| 2005/0083912 A1* | 4/2005 | Afshar | ................ | H04L 65/1104 370/352 |

(Continued)

*Primary Examiner* — Romani Ohri
(74) *Attorney, Agent, or Firm* — Vista IP Law Group, LLP (57) ABSTRACT

Methods, systems, and apparatuses are provided for data communication with user communication devices via a network address translator (NAT). In one example, a set of proxy servers is configured to effect communications through mapped data-communication paths of the NAT during data communication sessions through or with the user communication devices. The mapped paths are susceptible to being unmapped by the NAT if the mapped path is unused for a threshold duration of time. The proxy servers maintain the mapped paths through the NAT by prompting the user communication devices to communicate data to the set of proxy servers, for a duration of time exceeding a threshold duration of time.

19 Claims, 9 Drawing Sheets

(56) References Cited

U.S. PATENT DOCUMENTS

2008/0225865 A1\* 9/2008 Herzog ............. H04W 52/0229
370/392
2010/0124211 A1\* 5/2010 Payyappilly .......... H04W 76/25
370/338

\* cited by examiner

NAT TRAVERSAL IN VoIP COMMUNICATION SYSTEM

RELATED APPLICATION DATA

This application is a continuation of U.S. patent application Ser. No. 17/521,065 filed on Nov. 8, 2021, now U.S. Pat. No. 11,838,259, which is a continuation of U.S. patent application Ser. No. 16/859,785 filed on Apr. 27, 2020, now U.S. Pat. No. 11,184,320, which is a continuation of U.S. patent application Ser. No. 15/882,851 filed on Jan. 29, 2018, now U.S. Pat. No. 10,637,824, which is a continuation of U.S. patent application Ser. No. 14/093,211 filed on Nov. 29, 2013, now U.S. Pat. No. 9,912,636. The entire disclosures of the above applications are expressly incorporated by reference herein.

FIELD OF THE INVENTION

The present disclosure relates to voice-over-IP (VOIP) communications.

OVERVIEW

VoIP technology allows for calls to be made using internet connections. VoIP technology can be used in place of traditional analog/digital phone lines and can also be used to supplement traditional phone lines. Depending upon the type of VoIP servers and the VoIP provider's capabilities, VOIP calls can be made between VoIP users and/or to anyone having a telephone number (e.g., calls to local, long distance, mobile, and/or international numbers). VoIP calls can be initiated and received using a general purpose computer (e.g., using software that provides a soft phone interface), specialized hardware (e.g., a VoIP-enabled telephone), or specialized interface equipment (e.g., a VoIP adapter for an analog telephone).

SUMMARY

Aspects of the present disclosure are directed to an apparatus and method for communication with VoIP-enabled devices via a network address translator (NAT). These and other aspects of the present disclosure are exemplified in a number of implementations and applications, some of which are shown in the figures and characterized in the claims section that follows.

In one or more embodiments, an apparatus is provided for VOIP communication with VoIP-enabled devices via a NAT. The apparatus includes a set of proxy servers configured to relay communications through mapped paths of the NAT during operations including VOIP sessions through or with the plurality of VoIP-enabled devices and during other operations not involving VoIP sessions through or with the plurality of VOIP-enabled devices. Each of the mapped paths is susceptible to being unmapped by the NAT if the mapped path is unused for a threshold duration of time. The apparatus maintains the mapped paths through the NAT to the VoIP-enabled device by prompting the VoIP-enabled devices to communicate data to the set of proxy servers. More specifically, a VoIP-enabled device is prompted to communicate data to the set of proxy servers if the VoIP-enabled device does not communicate with the set of proxy servers for a duration of time exceeding the threshold duration of time.

In some embodiments, a system for VoIP communication is provided. The system includes a NAT and a plurality of VoIP-enabled devices communicatively connected to a local area network (LAN) side of the NAT. The system also includes a set of proxy servers communicatively connected to a wide area network (WAN) side of the NAT. The set of proxy servers is configured to register each of the VoIP-enabled devices with the set of proxy servers. For each of the VoIP-enabled devices, the set of proxy servers is also configured to relay communications to and from the VoIP-enabled device through a respective mapped path of the NAT. Each of the mapped paths is susceptible to being unmapped by the NAT if the mapped path is unused for a threshold duration of time.

The set of proxy servers is configured to maintain the mapped paths through the NAT to the VoIP-enabled device by prompting the VoIP-enabled devices to communicate data to the set of proxy servers. More specifically, a VoIP-enabled device is prompted to communicate one or more messages to the set of proxy servers if the VoIP-enabled device does not communicate with the set of proxy servers for a duration of time exceeding the threshold duration of time. The system also includes a call control server. The call control server is configured to, in response to an incoming VoIP session to a VoIP-enabled device of the plurality of VoIP-enabled devices, determine a proxy server of the set with which the VOIP-enabled device is registered. The call control server routes the incoming VoIP session to the VoIP device via the determined proxy server.

In some embodiments, a method is provided for communicating with a plurality of VOIP-enabled devices via a NAT. The VoIP-enabled devices are registered with a set of proxy servers. For each of the VoIP-enabled devices, communications are relayed by the through a mapped path of the NAT during VoIP sessions with the VoIP-enabled device using one of the set of proxy servers, with which the VoIP-enabled device is registered. Each of the mapped paths is susceptible to being unmapped by the NAT if the mapped path is unused for a threshold duration of time. In response to a VoIP-enabled device not communicating with the set of proxy servers for a duration of time exceeding the threshold duration of time, the VoIP-enabled device is prompted to transmit one or more messages to one of the set of proxy servers in order to maintain the respective mapped path of the NAT.

BRIEF DESCRIPTION OF THE DRAWINGS

The invention may be more completely understood in consideration of the following detailed description of various embodiments of the invention in connection with the accompanying drawings, in which.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure describes various methods, systems, and apparatuses for communication with end-point devices (e.g., VoIP-enabled devices) though a NAT. For ease of explanation, the examples and embodiments herein are primarily described with reference to communication of VoIP data between VoIP-enabled devices. While the disclosed embodiments are not necessarily limited to such applications, various aspects of the present disclosure may be appreciated through a discussion of various examples using this context.

VoIP-enabled devices may initiate or receive VoIP calls. For ease of reference, a VOIP call may be referred to as a VoIP session and such terms may be used interchangeably herein. Proxy servers may be included in call-routing paths between VoIP-enabled devices and act as intermediaries to forward media data and control signals between VoIP-enabled devices. The control signals may be used, for example, to initiate and configure various parameters of VoIP sessions. A proxy server may include, for instance, a call control server, a Session Border Control (SBC) server, an IP Private Branch Exchange (PBX), or a Contact Center application. A proxy server may help to facilitate call setup and configuration using an appropriate control protocol (e.g., the Session-Initiation-Protocol (SIP)) and also act as a media-relay server (MRS) for forwarding media data (e.g., real-time protocol (RTP) data). For instance, the MRS can convert received audio media in transit, so that VoIP-enabled devices may communicate using different transmission protocols. SIP signaling function of a proxy server may be performed by, e.g., an SIP back-to-back user agent (B2BUA), which is linked with the MRS and can oversee and provide additional control and value-added features (e.g., billing, automatic call disconnection, and/or call transfer).

In some various disclosed embodiments, SIP BSBUA and MRS functionality is distributed across a plurality of proxy servers. Use of multiple proxy servers allows a high traffic load to be distributed among several servers, and provides redundancy to remove single points of failure and improve reliability. Use of multiple distributed proxies may also be used to improve scalability and availability of service.

In some various disclosed embodiments, the proxy servers also provide a mechanism for managing connections with VoIP-enabled devices through a NAT. NATs are used in many networks to allow multiple devices local-area-network (LAN) side of the NAT to communicate data via a single IP address on a wide-area-network (WAN) side of the NAT. For each connection initiated by the VoIP-enabled devices, a mapped path is created and maintained by the NAT for a limited period of time. Data may be communicated back to the initiating device using the mapped path.

NATs can create a problem for VOIP applications because VoIP-enabled devices may be idle for long periods (in-between calls) beyond those that NATs are designed to maintain. If the mapped path to a VoIP-enabled device is not maintained, it will not be possible to route incoming VoIP calls to the VoIP-enabled device. In some VoIP systems, VoIP-enabled devices are pre-configured to periodically transmit data to a specific proxy server used by a VoIP service provider in order to maintain a mapped path through the NAT. In contrast to this approach, some disclosed embodiments use a set of proxy servers to maintain mapped paths through a NAT. The proxy servers are also used to route VoIP data to and from VoIP devices. In some embodiments, proxy servers are configured to maintain mapped paths through the NAT by prompting the VoIP-enabled devices to communicate responses to the proxy servers. As a result of communicating the responses to the proxy servers through the NAT, the mapped paths are maintained. For ease of reference, maintaining mapped paths of a NAT by use of a server(s) to prompt VoIP-enabled devices to communicate responses may be referred to a server-side NAT traversal.

In one or more embodiments, an apparatus is provided for VOIP communication with VoIP-enabled devices in a VoIP system via a NAT. The apparatus includes a set of proxy servers configured to relay communications through mapped paths of the NAT during operations including VoIP sessions through or with the plurality of VoIP-enabled devices and during other operations not involving VoIP sessions through or with the plurality of VoIP-enabled devices. The mapped paths are susceptible to being unmapped by the NAT if the mapped paths are not used for a threshold duration of time. The apparatus maintains the mapped paths through the NAT to the VoIP-enabled device by prompting the VoIP-enabled device to communicate data to the set of proxy servers. More specifically, a VoIP-enabled device is prompted to communicate data to the set of proxy servers if the VOIP-enabled device does not communicate with the set of proxy servers for a duration of time exceeding the threshold duration of time. The proxy servers are configured to prompt the VoIP-enabled device within a timeframe sufficient to prevent the respective one of the mapped paths the NAT to the VoIP-enabled device from being unmapped by the NAT.

The VoIP-enabled devices may be configured to register with one of the set of proxy servers. For each proxy-server, a list is maintained that indicates which of the VoIP-enabled devices is registered with the proxy server. The list may also indicate a period of time for which each VoIP-enabled device is registered. In one implementation, a VoIP-enabled device is added to a registration list for a proxy server in response to an SIP register message being communicated from the VoIP-enabled device to the proxy server. The VoIP-enabled device is removed from the registration list of a proxy server in response to either the registration of the VoIP device expiring. In some implementations, the VoIP-enabled device may also be removed from the registration list of a proxy server in response to a new SIP dialog being initiated by the VoIP-enabled device through another proxy server.

In one implementation, each of the set of proxy servers includes a registration/subscription circuit configured to maintain a list of the plurality of VoIP-enabled devices registered with the proxy server. The registration/subscription circuit is also configured to perform the prompting of the VoIP-enabled device to maintain the mapped paths through the NAT. Each proxy also includes a routing circuit configured and arranged to relay the communications during the VoIP sessions with the VoIP devices using the mapped paths.

In some embodiments, the apparatus further includes a call control server configured to route incoming calls to VoIP devices based on the registration of the devices with the proxy servers. In response to an incoming VoIP call to a VoIP-enabled device, the call control server determines the proxy server with which the VoIP-enabled device is registered, and routes the incoming VoIP session to the determined proxy server.

In some embodiments, each proxy server is configured to maintain a timer indicating a duration of time since the VoIP-enabled device registered/subscribed with the set of proxy servers, and to prompt the VoIP-enabled device to transmit a communication to the proxy server in response to the duration of time indicated by the timer exceeding a threshold amount of time. In response to the VoIP-enabled device initiating one or more SIP dialogs through a proxy server, with which the VoIP-enabled device is not currently registered or subscribed, the proxy server is configured to use the SIP dialog to maintain a respective one of the mapped paths through the NAT until an end of the SIP dialog. An SIP dialog may be initiated and controlled using a number of SIP messages, including, e.g., SIP initial invite, re-invite, keep-alive, and bye for termination. For instance, in some embodiments, SIP options messages may be used to prompt a VoIP-enabled device to provide a response message to a proxy server.

In some embodiments, systems for VOIP communication are provided that include the NAT, the VoIP-enabled devices, the proxy servers, and/or the call-control server, in various combinations. For example, one such system includes a NAT, VOIP-enabled devices, proxy servers, and/or a call-control server. Another such system includes proxy servers and a call-control server configured to communicate with a plurality of third party VoIP-enabled devices connected to a third party NAT.

Figure 1A:
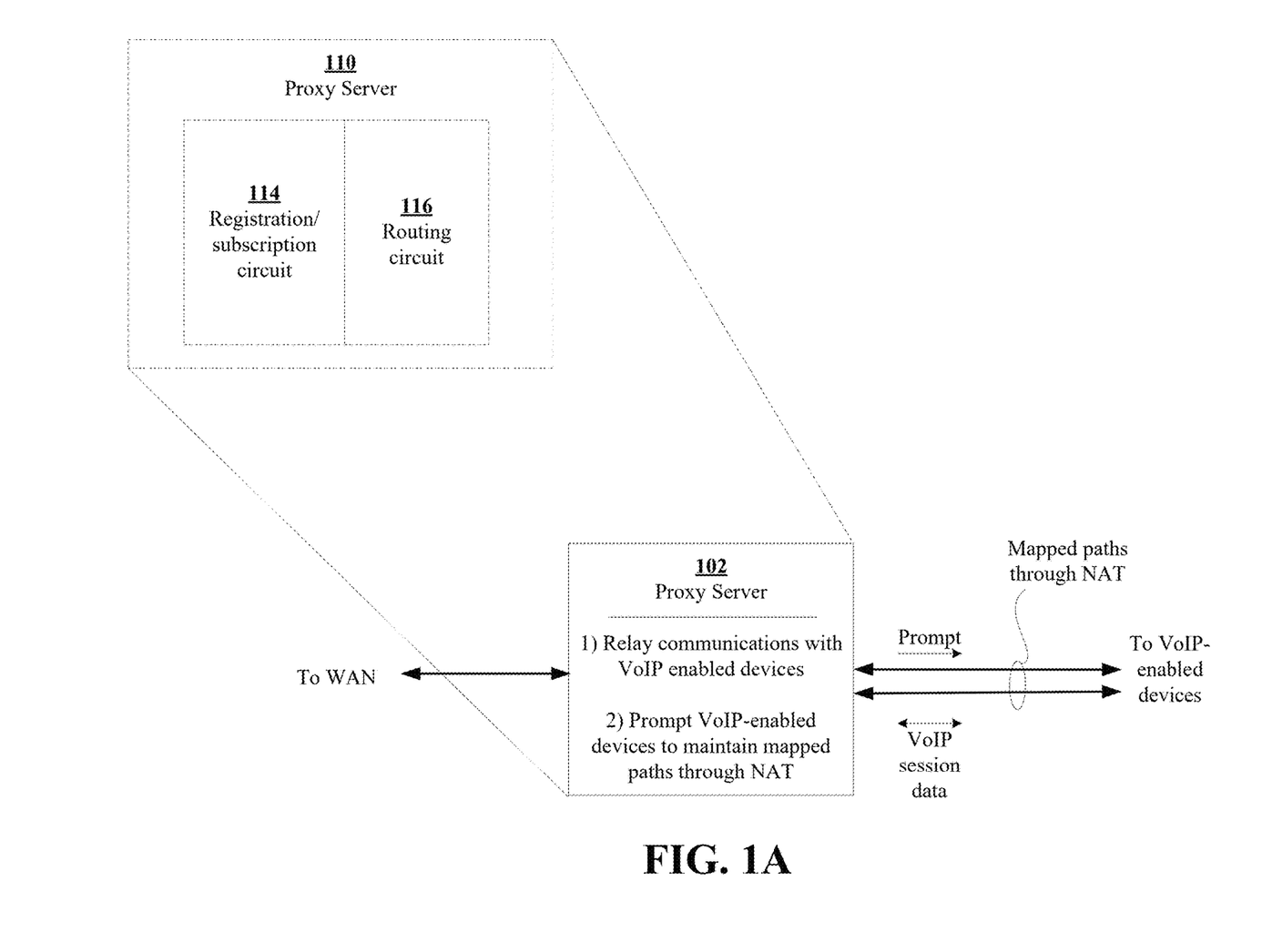
FIG. 1A shows a proxy server configured for server-side NAT traversal.

Turning now to the figures, FIG. 1A shows a proxy server configured for server-side NAT traversal. The proxy server 102 includes a routing circuit 116 configured to relay communications between VoIP-enabled devices (not shown in FIG. 1A) connected to a NAT (not shown in FIG. 1A) and other VoIP devices communicatively connected to the proxy server 102 via a WAN (e.g., the internet). As indicated above, the mapped paths are susceptible to being unmapped by the NAT if the mapped paths are not used for a threshold duration of time.

The proxy server 102 maintains the mapped paths through the NAT to the VoIP-enabled device by prompting the VoIP-enabled devices to communicate data to the set of proxy servers. In this example, the proxy server 102 includes a registration/subscription circuit 114 configured to maintain a list of the plurality of VoIP-enabled devices registered with the proxy server. The registration/subscription circuit 114 is also configured to maintain the mapped paths through a NAT for VoIP-enabled devices that are registered with the proxy server, or that have initiated an SIP dialog (e.g., a VoIP session) with the proxy server 102.

The registration/subscription circuit 114 is configured to maintain a mapped path through a NAT prompt for a VoIP-enabled device by prompting the VoIP-enabled devices to transmit a response message if the VoIP-enabled device does not communicate any data to the proxy server 102 for the threshold duration of time. For example, in some implementations, the registration/subscription circuit 114 is configured to periodically prompt each of the VoIP-enabled devices currently registered with the proxy server 102 based on a respective timer. The registration/subscription circuit 114 may stop prompting a registered VoIP-enabled device after registration has expired. In some implementations, the registration/subscription circuit 114 may also stop prompting a registered VoIP-enabled if the VoIP-enabled device initiates an SIP dialog or registers with a different proxy server.

In some implementations, the registration/subscription circuit 114 may also maintain a mapped path for an unregistered VoIP-enabled device that has initiated an SIP dialog with the proxy server 102. For instance, during an SIP dialog with the VoIP-enabled device, the registration/subscription circuit 114 may prompt the VoIP-enabled device to send a response if a communication has not been received from the VoIP-enabled device for a threshold period of time.

Figure 1B:
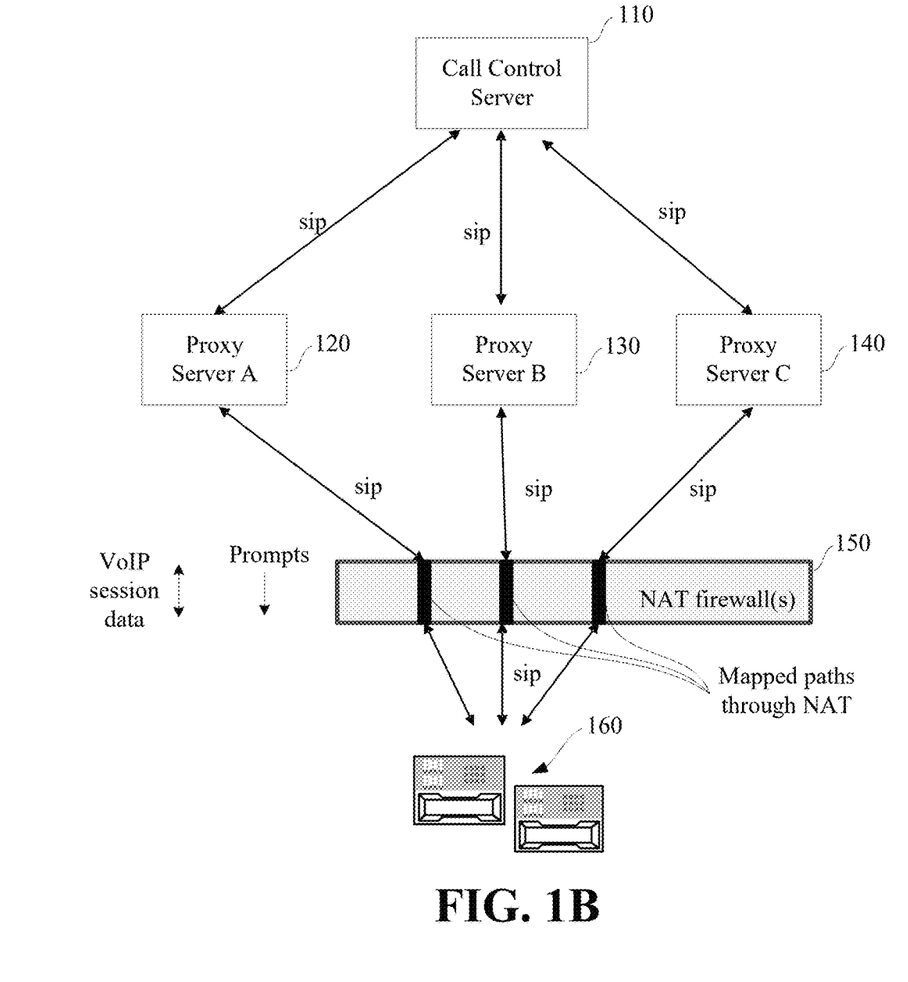
FIG. 1B shows a VoIP system having a set of proxy servers configured for server-side NAT traversal.

FIG. 1B shows a VoIP system having a set of proxy servers configured for server-side NAT traversal. The system includes a NAT 150 and a plurality of VoIP-enabled devices 160 communicatively connected to a local area network (LAN) side of the NAT. The system also includes a set of proxy servers 120, 130, and 140 communicatively connected to a wide area network (WAN) side of the NAT. The set of proxy servers is configured to register each of the VoIP-enabled devices with the set of proxy servers. For each of the VoIP-enabled devices, the set of proxy servers is also configured to relay communications to and from the VoIP-enabled device through a respective mapped path of the NAT.

In this example, each of the VoIP-enabled devices 160 is connected to the same NAT 150. However, the system may include multiple NATs with some VoIP-enabled devices connected to one NAT and some other VoIP-enabled devices connected to another NAT. For ease of illustration and explanation, the examples herein are primarily described with reference to VoIP-enabled devices 160 connected to the same NAT (e.g., NAT 150).

The proxy servers 120, 130, and 140 are configured to maintain the mapped paths through the NAT to the VoIP-enabled devices 160 by prompting the VoIP-enabled devices to communicate data to the set of proxy servers. More specifically, a VoIP-enabled device is prompted to communicate one or more messages to the set of proxy servers, in response to the VoIP-enabled device not communicating with the set of proxy servers for a duration of time exceeding the threshold duration of time. In one embodiment, each of the proxy servers 120, 130, and 140 may be implemented, for example, using the proxy server shown in FIG. 1A.

In this example, the system also includes a call control server 110. The call control server 110 is configured to determine a proxy server that a VoIP-enabled device is registered with in response to an incoming VoIP session to the VoIP-enabled device. The call control server routes the incoming VoIP session to the VoIP device via the determined proxy server.

Figure 2:
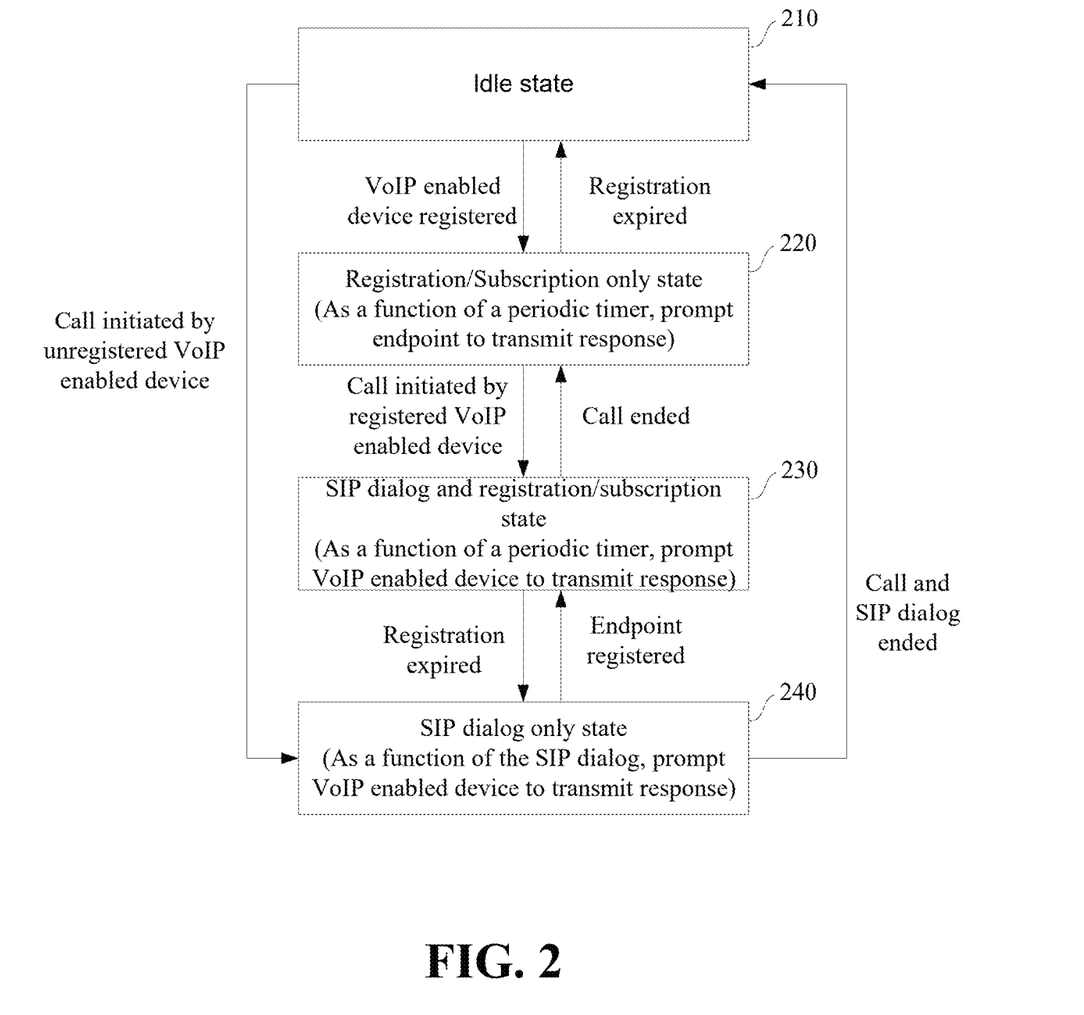
FIG. 2 shows a state-machine for operating a proxy server, in accordance with one or more disclosed embodiments.

FIG. 2 shows a state-machine for operating a proxy server, in accordance with one or more disclosed embodiments. The proxy server is initially operated in an idle state 210. In response to a VoIP-enabled device being registered, the proxy server transitions from the idle state to a registration/subscription only state 220. While operating in the registration/subscription only state 220, the proxy server prompts the registered VoIP-enabled device, as a function of a periodic timer, to transmit a response to the proxy server. The transmitted response causes the NAT to maintain a mapped path between the proxy server and the VoIP-enabled device.

If a registered VoIP-enabled device initiates a VoIP session, the proxy transfers from the registration/subscription only state 220 to an SIP dialog and registration state 230. In the SIP dialog and registration state 230, the proxy server continues to prompt the VOIP-enabled device, as a function of a periodic timer.

If registration of the VoIP-enabled device expires while the proxy server is operating in the SIP dialog and registration state 230, the proxy server begins operating in SIP dialog only state 240. The proxy server may also begin operating in the SIP dialog only state 240 if a call is initiated by an unregistered device. While operating in the SIP dialog only state, the proxy server prompts the VoIP-enabled device to send keep-alive responses based on the SIP dialog duration. For instance, the proxy server may prompt the VoIP-enabled device to provide a response if the SIP dialog has not ended and a communication has not been received from the VoIP-enabled device for a threshold period of time. Once the SIP dialog ends, the proxy server stops prompting the VoIP-enabled device and transitions back to the idle state 210.

If the VoIP-enabled device renews registration while operating in the SIP dialog only state, the proxy server transitions back to the SIP dialog and registration state 230. If the VoIP-enabled device is still registered when the SIP dialog ends while operating in the SIP and registration state 230, the proxy server transitions back to the registration/subscription only state 220. If registration of the VoIP-enabled device expires while operating in the registration/subscription only state 220, the proxy server transitions back to the idle state 210.

As described above, proxy servers maintain mapped data paths from the NAT so that both incoming and outgoing messages can be communicated to/from the VoIP-enabled device. However, when multiple proxy servers are used, as shown in FIG. 1B, a VoIP-enabled device may register with and/or initiate SIP dialogs with multiple ones of the proxy servers, thereby creating multiple mapped paths through the NAT. For instance, a VoIP-enabled device can register to a domain configured as DNS A or SRV record, which has the list of N proxy servers within. In this scenario, the VoIP-enabled device may register to any of the N servers at one time and switch to another server during the next registration interval. The path switch typically depends on SIP registration expiration timer, and DNS record Time-To-Live (TTL) setting. The SIP registration path may not be the same as SIP dialog path. For example, SIP INVITE can both create SIP dialog. The SIP dialog may choose a different path from SIP registration. All SIP messages for an SIP dialog need to stay on the dialog path created. Each SIP signaling path created by an SIP registration or SIP dialog may create a new mapped path in the NAT.

In some embodiments, the distributed proxy servers keep track of both SIP registration paths and SIP dialog paths, and prompt the VoIP-enabled devices to keep the corresponding mapped paths through the NAT open for the duration of SIP registrations or SIP dialogs. As indicated above, VoIP-enabled devices may be prompted to communicate responses to the proxy servers by communicating SIP option messages to the VoIP-enabled devices.

In some instances, the SIP dialog path may happen to merge into the same path as SIP registration and only one mapped path need be maintained. In some other instances, the SIP dialog path and the registration path can fork to different paths requiring the creation of separate mapped paths through the NAT. Multiple SIP registration or subscriptions may also merge into the same path or fork to different paths. There can be multiple SIP dialogs created by INVITE messages. The dialogs may all choose the same path or different paths.

The distributed proxy servers keep track of all the paths being used to communicate SIP dialogs and the paths used to register the VoIP-enabled devices. The proxy servers are configured to only send one message prompt at one time per path to the same VoIP-enabled device.

As described with reference to FIG. 2, the prompting performed by each proxy server depends on whether the VoIP device has initiated an SIP dialog with the proxy server and whether the SIP device is registered/subscribed with the proxy. For VOIP-enabled devices that are registered/subscribed with a proxy server, the proxy server may prompt the VOIP-enabled device according to a periodic timer until the registration/subscription expires. For unregistered devices that have initiated an SIP dialog through the proxy server, the proxy server may prompt the VoIP-enabled device as required to maintain the mapped path, used by the SIP dialog, for the duration of the SIP dialog. When an SIP dialog has concluded (e.g., when no more SIP messages are communicated on the SIP dialog path), the corresponding proxy server stops prompting the VoIP-enabled device for responses.

Figure 3A:
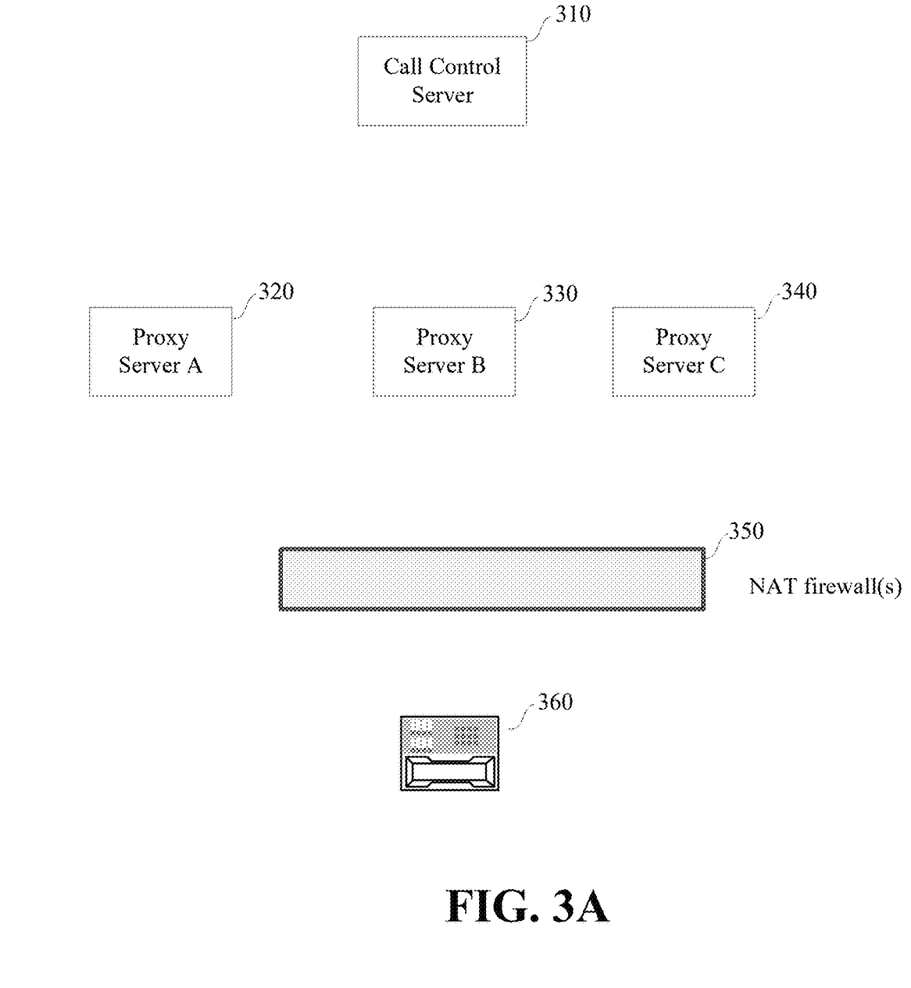
FIGS. 3A-3F illustrate an example communication scenario in a VoIP system.

FIGS. 3A-3F each illustrates an example communication scenario in a VoIP system. The VoIP system is similar to that shown in FIG. 1B. FIG. 3A shows components of the system without any SIP registrations or SIP dialogs initiated. The system includes a VoIP-enabled device 360 communicatively connected to a local area network (LAN) side of a NAT 350. A set of proxy servers 320, 330, and 340 is communicatively connected to a wide area network (WAN) side of the NAT. The set of proxy servers is configured to route data to and from the VoIP-enabled device 360 through the NAT. As described above, the proxy servers are configured to maintain mapped paths through the NAT that are used for SIP registration/subscription and/or SIP dialogs initiated by the VoIP-enabled device 360. The system also includes a call control server 310 configured to route incoming VoIP calls to an appropriate one of the proxy servers with which the VOIP-enabled device 360 is registered.

Figure 3B:
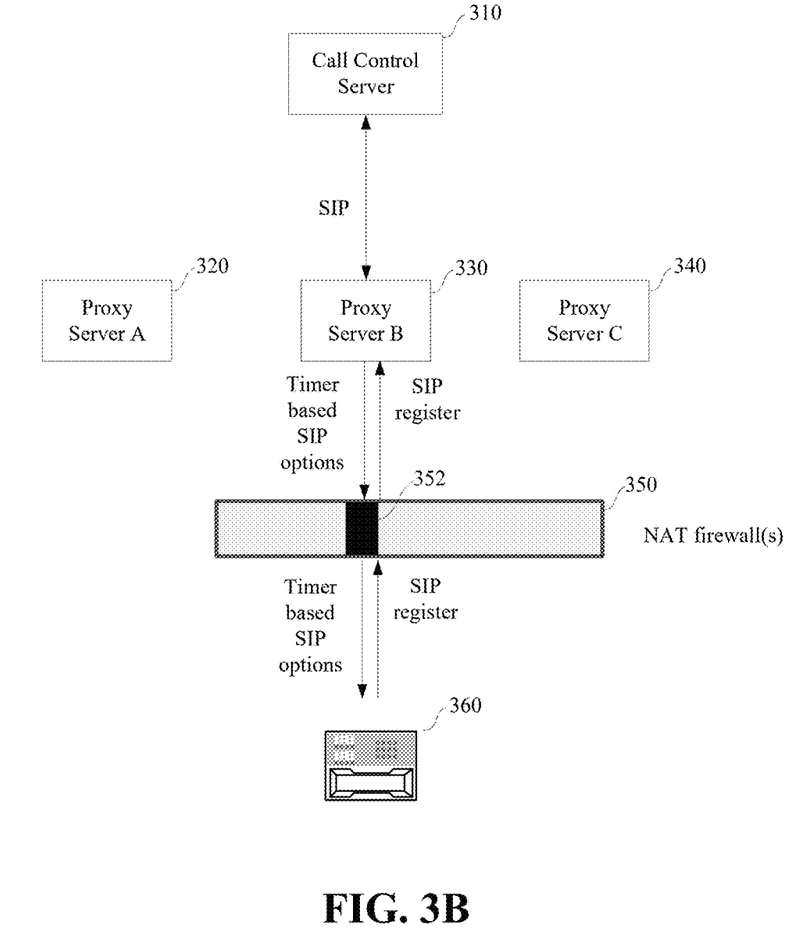

In FIG. 3B, the VoIP-enabled device 360 communicates an SIP registration message to proxy server B 330. The SIP registration message causes the NAT to create a mapped path 352 between the VoIP-enabled device 360 and the proxy server B 330. In response to the SIP registration message, the proxy server B 330 registers the VoIP-enabled device. The proxy server B 330 also transmits SIP options messages based on a periodic timer, until registration expires. The SIP options messages prompt the VoIP-enabled device to send responses-thereby maintaining the mapped path 352. SIP data is also communicated to call control server 310 to update registration data of the call control server 310 and/or provide control commands to the active proxy servers.

Figure 3C:
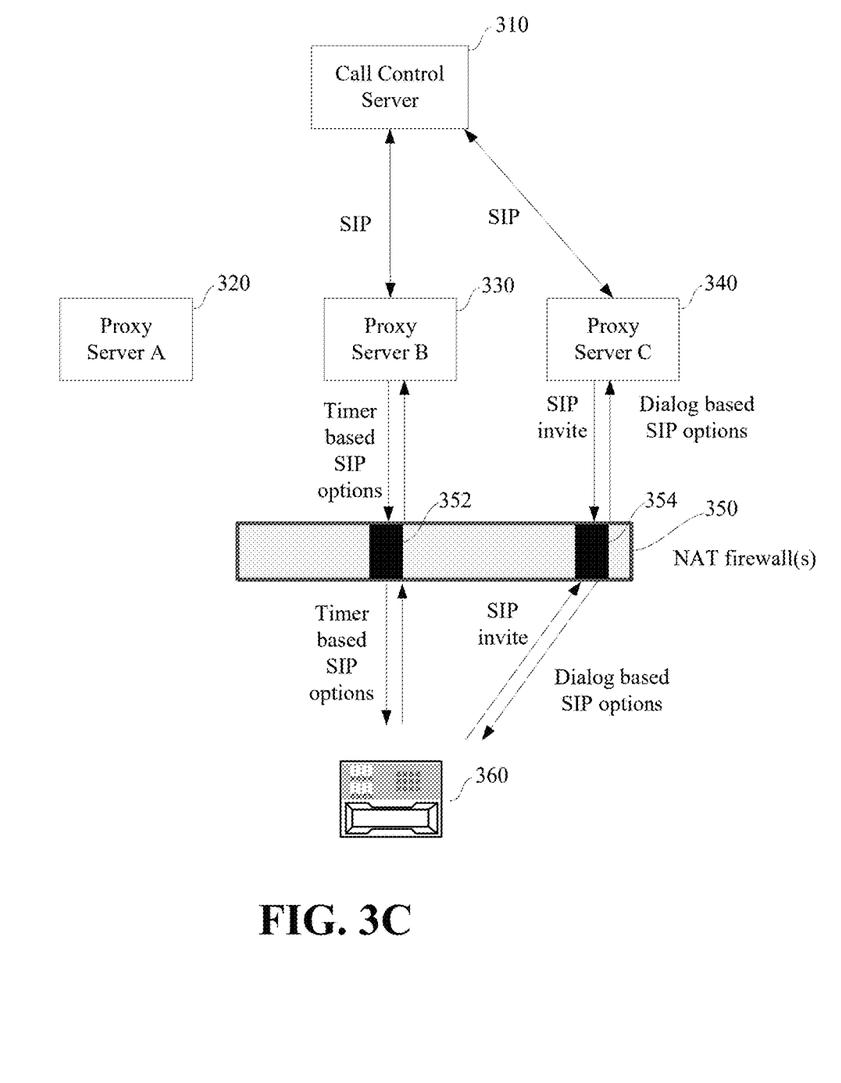

In FIG. 3C, the VoIP-enabled device 360 initiates an SIP dialog by transmitting an SIP invite message via proxy server C 340. The SIP invite message causes the NAT to create another mapped path 354 between the VoIP-enabled device 360 and the proxy server C 340. The SIP invite message causes the proxy server C 340 to transmit SIP options messages, while the SIP dialog is active, to prompt the VoIP-enabled device 360 to send responses and thereby maintain the mapped path 354. The proxy server B 330 continues to transmit SIP options messages to maintain mapped path 352 until the registration of the VoIP-enabled device 360 with proxy server B 330 expires. SIP data is also communicated to call control server 310 to update registration data of the call control server 310 and/or provide control commands to the active proxy servers.

Figure 3D:
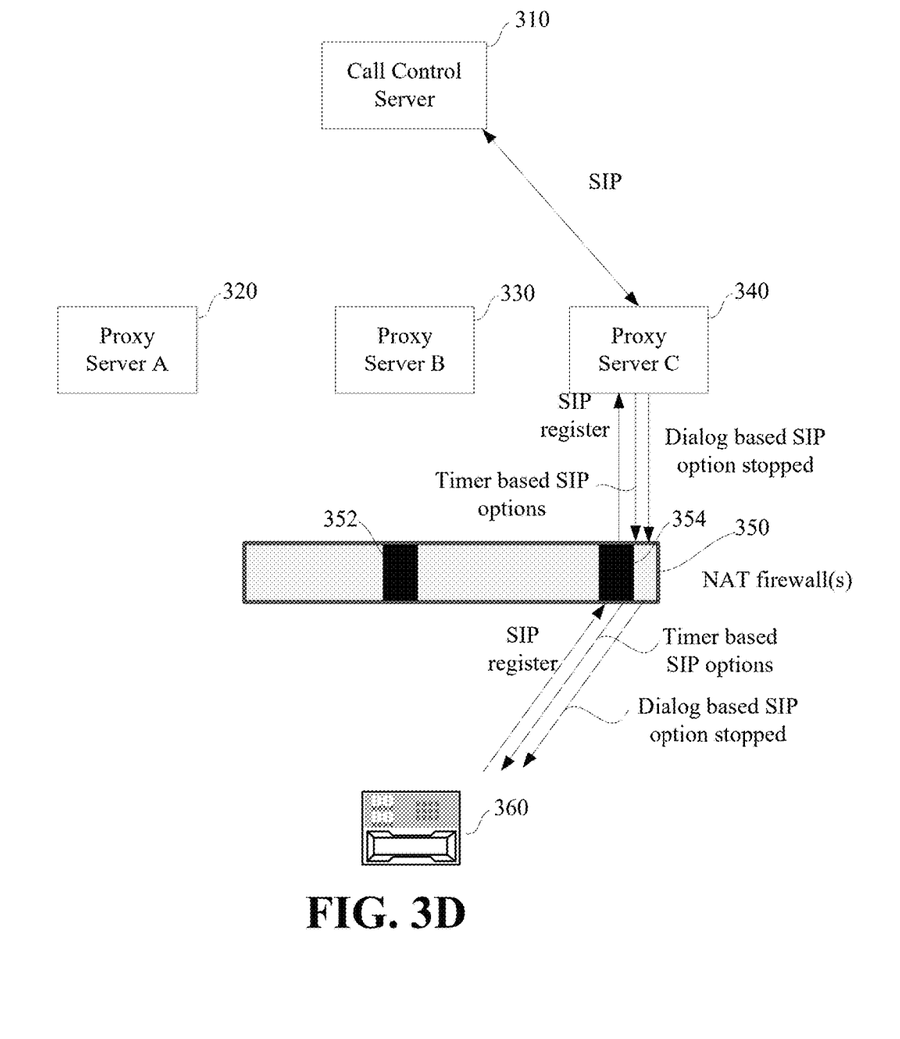

In FIG. 3D, the registration of the VoIP-enabled device 360 with proxy server B 330 has expired and the proxy server no longer sends SIP options messages to prompt the VoIP-enabled device 360 to send responses. Note, that the NAT 350 may still maintain the mapped path 352 for a threshold period of time.

In FIG. 3D, the VoIP-enabled device communicates an SIP registration message to proxy server C 340. In response to the SIP registration message, proxy server C 340 registers the VoIP-enabled device 360. As described with reference to FIG. 2, following the registration, the proxy suspends transmitting SIP options, as a function of the SIP dialog, to maintain the mapped path 354. Instead, the proxy server begins transmitting SIP options as a function of a periodic timer in order to maintain the mapped path 354 while the registration is active. SIP data is also communicated to call control server 310 to update registration data of the call control server 310 and/or provide control commands to the active proxy servers.

Figure 3E:
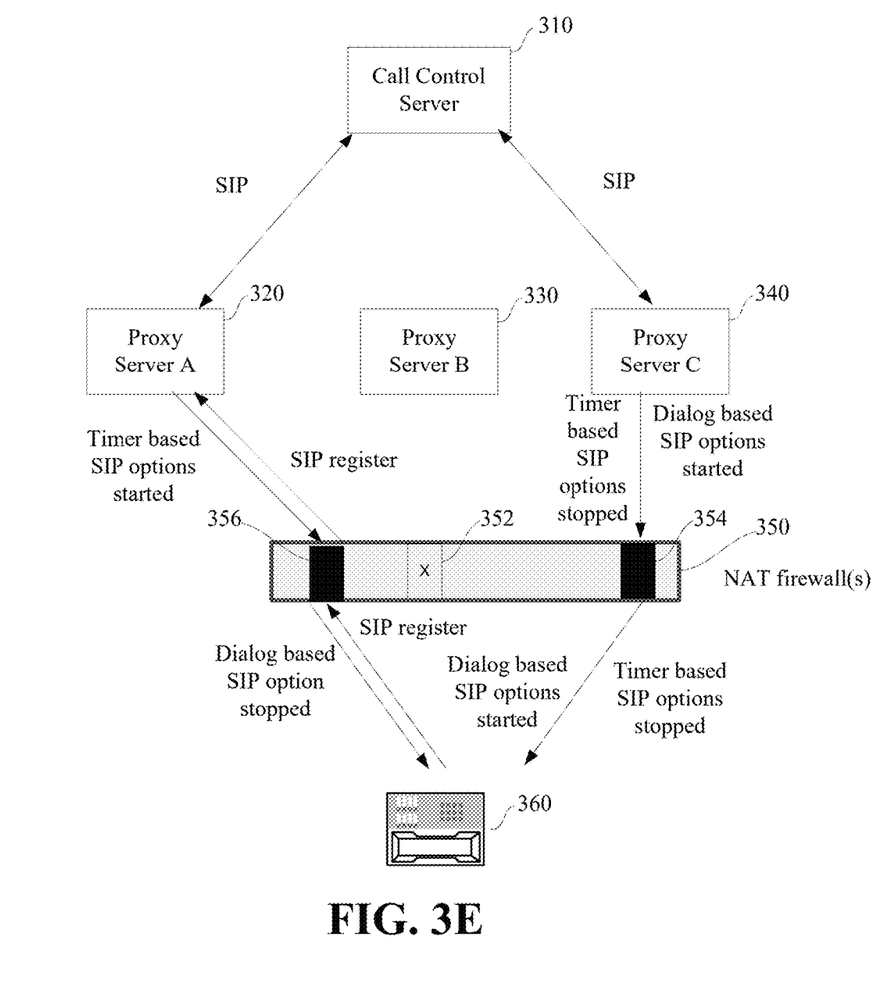

In FIG. 3E, path 352 is unmapped by the NAT. The proxy server C 340 stops transmitting SIP options messages as a function of a periodic timer when the registration timer expires on the path, but it resumes to transmit SIP options messages to the VoIP-enabled device 360, as a function of an active SIP dialog, to maintain the mapped path 354 while the SIP dialog of the VoIP-enabled device 360 remains active. The VoIP-enabled device 360 communicates an SIP registration message to proxy server A 320. The SIP registration message causes the NAT to create another mapped path 356 between the VoIP-enabled device 360 and the proxy server A 320. In response to the SIP registration message, the proxy server A 320 registers the VoIP-enabled device and begins transmitting SIP options messages based on a periodic timer, until the registration expires. SIP data is also communicated to call control server 310 to update registration data of the call control server 310 and/or provide control commands to the active proxy servers.

Figure 3F:
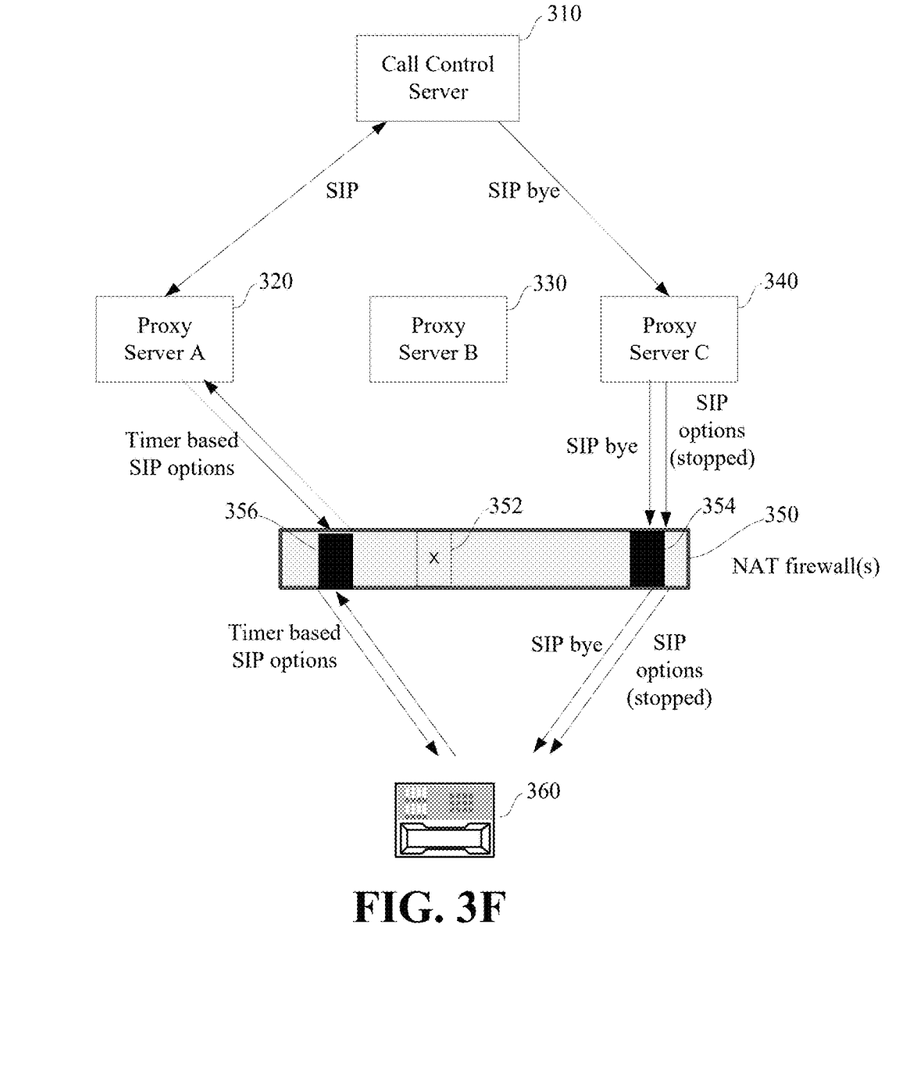

In FIG. 3F, the proxy server C 340 receives an SIP bye message, via the call control server 310. Proxy server C 340 forwards the SIP bye message to the VoIP-enabled device, which terminates the SIP session. At this time, SIP dialog is ended so that proxy server C 340 stops transmitting SIP options messages to the VoIP-enabled device 32 seconds (a configurable timer) after the SIP dialog is ended and the mapped path 354 is allowed to be unmapped by the NAT. However, the VoIP-enabled device 360 is still registered with proxy server A 320, which continues to communicate SIP options messages based on a periodic timer in order to maintain the mapped path 356 while the registration is active.

The various embodiments as discussed herein may be implemented using a variety of structures and related operations/functions. For instance, one or more embodiments as described herein may be computer-implemented or computer-assisted, as by being coded by software within a coding system as memory-based codes or instructions executed by a computer processor, microprocessor, PC or mainframe computer. Such computer-based implementations are implemented using one or more programmable circuits that include at least one computer-processor and internal/external memory and/or registers for data retention and access. One or more embodiments may also be implemented in various other forms of hardware such as a state machine, programmed into a circuit such as a field-programmable gate array, or implemented using electronic circuits such as digital or analog circuits. In addition, various embodiments may be implemented using a tangible storage medium, which stores instructions that, when executed by a processor, performs one or more of the steps, methods or processes described herein (e.g., the processor is configured via the instructions). These applications and embodiments may also be used in combination; for instance, certain functions can be implemented using discrete logic (e.g., a digital circuit) that generates an output that is provided as an input to a processor.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although aspects may be described with reference to individual figures, it will be appreciated that aspects from one figure can be combined with aspects from another figure even though the combination is not explicitly shown or explicitly described as a combination. It is intended that the specification and illustrated embodiments be considered as examples only, with a true scope of the invention being indicated by the following claims.

What is claimed is:

1. An apparatus comprising:
 a server set of one or more proxy servers as a contact center to process incoming data communications involving user-communication devices and to manage a registration list of the user-communication devices including a first user-communication device; and
 a network address translator (NAT), including computer processing circuitry, to cooperatively communicate with the first user-communication device for maintaining a communication session involving the first user-communication device via one of a plurality of data-communication paths mapped by the NAT ("the mapped path") relative to a threshold time, the threshold time being a function of a period in which the communication session is to expire and being associated with control for unmapping the mapped path and being a function of the first user-communication device having initiated the communication session as one of the user-communication devices in the registration list.

2. The apparatus of claim 1, wherein the computer processing circuitry is to respond to the first user-communication device initiating the communication session by causing the first user-communication device to be prompted based on a timer for maintaining the communication session if the first user-communication device is a registered VoIP-type device, and to be prompted based on a SIP dialog duration for maintaining the communication session if the first user-communication device is a non-registered VoIP-type device.

3. The apparatus of claim 1, wherein the threshold time is set as a function of a threshold during which the communication session is to expire and the computer processing circuitry is to stop prompting the first user-communication device if a Session Initiation Protocol (SIP) dialog is initiated by the first user-communication device through a proxy server that is associated with the server set.

4. The apparatus of claim 1, wherein the server set is to prompt the first user-communication device to transmit data to the server set via the mapped path to prevent the mapped path from becoming unmapped.

5. The apparatus of claim 1, wherein the contact center is managed on behalf of a client entity linked with each of the user-communication devices including the first user-communication device.

6. The apparatus of claim 1, wherein the computer processing circuitry is to maintain the registration list for each of the user-communication devices including the first user-communication device.

7. The apparatus of claim 1, wherein the computer processing circuitry is to use the registration list to maintain the mapped path via a NAT prompt for the first user-communication device.

8. The apparatus of claim 1, wherein the computer processing circuitry is to use the registration list to maintain the mapped path so long as the first user-communication device is currently registered with the server set.

9. The apparatus of claim 1, wherein the computer processing circuitry is to cease use of the registration list to maintain the mapped path after a period of time corresponding to the threshold time, associated with control for unmapping the mapped path, having expired.

10. A method comprising:
controlling, via a network address translator (NAT), mapped data-communication paths involving a server set of one or more proxy servers, to which a plurality of Internet-enabled devices are registered, by:
managing a registration list of user-communication devices including a first user-communication device; and
causing one or more communications between a network address translator (NAT) and the first user-communication device for maintaining a communication session involving the first user-communication device via one of a plurality of data-communication paths mapped by the NAT ("the mapped path") relative to a threshold time, the threshold time being a function of a period in which the communication session is to expire and being associated with control for unmapping the mapped path and being is a function of the first user-communication device having initiated the communication session as one of the user-communication devices in the registration list.

11. The method of claim 10, wherein the first user-communication device is to be registered on the registration list for recording registration of the first user-communication device during for a period of time, and wherein in response to the period of time elapsing, the first user-communication device is to be unregistered from the registration list.

12. The method of claim 10, wherein each of the user-communication devices is enabled for communication over the Internet via computer-based circuitry to communicate over the Internet.

13. The method of claim 10, wherein the first user-communication device is to transmit data to the server set as a function of time, relative to the threshold time, for maintaining the communication session.

14. The method of claim 10, wherein the first user-communication device is prompted to send a communication to the server set via the mapped path.

15. The method of claim 10, further including prompting the first user-communication device to cause transmission of a message, concerning Session Initiation Protocol options, to the user-communication device via the mapped data-communication paths through the NAT.

16. The method of claim 10, wherein each of the user-communication devices includes communications circuitry enabled for communications over the Internet.

17. The method of claim 10, wherein the first user-communication device is to be registered for a period of time indicated by a Session Initiation Protocol register message, the registration of the user-communication device expiring after a period of time has elapsed.

18. The method of claim 10, wherein the first user-communication device is to be registered for a period of time indicated by a subscribe message, the registration of the user-communication device expiring after a period of time has elapsed.

19. Data-storage circuitry including instructions which, in response to being executed by computer processing circuitry, causes a method to be performed, the method comprising:
controlling, via a network address translator (NAT), mapped data-communication paths involving a server set of one or more proxy servers, to which a plurality of Internet-enabled user-communication devices are registered;
managing a registration list of the user-communication devices including a first user-communication device; and
causing one or more communications between a network address translator (NAT) and the first user-communication device for maintaining a communication session involving the first user-communication device via one of a plurality of data-communication paths mapped by the NAT ("the mapped path") relative to a threshold time, the threshold time being a function of a period in which the communication session is to expire and being associated with control for unmapping the mapped path and being a function of the first user-communication device having initiated the communication session as one of the user-communication devices in the registration list.

* * * * *